(12) United States Patent
Johnson et al.

(10) Patent No.: US 8,565,523 B2
(45) Date of Patent: Oct. 22, 2013

(54) IMAGE CONTENT-BASED COLOR BALANCING

(75) Inventors: Garrett M. Johnson, San Francisco, CA (US); Russell Y. Webb, San Jose, CA (US); Jerremy Holland, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 13/152,206

(22) Filed: Jun. 2, 2011

(65) Prior Publication Data

US 2012/0308131 A1 Dec. 6, 2012

(51) Int. Cl.
*G06K 9/00* (2006.01)

(52) U.S. Cl.
USPC ......................................................... 382/167

(58) Field of Classification Search
USPC ............... 382/162–167; 348/22.31, 650, 652, 348/655; 358/1.9, 2.1, 516, 518
See application file for complete search history.

(56) References Cited

U.S. PATENT DOCUMENTS

| | | | | |
|---|---|---|---|---|
| 7,599,093 | B2 * | 10/2009 | Kagaya | 358/2.1 |
| 7,636,108 | B2 * | 12/2009 | Suzuki et al. | 348/223.1 |
| 2004/0196383 | A1 | 10/2004 | Suzuki et al. | |
| 2006/0066912 | A1 | 3/2006 | Kagaya | |
| 2009/0041347 | A1 | 2/2009 | Iguchi et al. | |

FOREIGN PATENT DOCUMENTS

| | | |
|---|---|---|
| EP | 1482743 A2 | 12/2004 |
| EP | 1617681 A1 | 1/2006 |
| EP | 1771013 A2 | 4/2007 |

OTHER PUBLICATIONS

Ford, Adrian et al., "Colour Space Conversions", Internet Citation, Aug. 11, 1998, XP-002311069, Retrieved from the Internet: URL:http://www.poynton.com/PDFs/coloureq.pdf, [retrieved on Aug. 11, 1998] paragraphs [0003], [0010], pp. 1-31.

PCT Notification of Transmittal of the International Search Report and the Written Opinion for Application No. PCT/US2012/040525 dated Sep. 7, 2012, 13 pages.

* cited by examiner

*Primary Examiner* — Jose Couso
(74) *Attorney, Agent, or Firm* — Fish & Richardson P.C.

(57) ABSTRACT

Methods, systems, and apparatus, including computer programs encoded on a computer storage medium, for applying color balancing to at least a portion of a digital image based on the digital image content. The color balancing process preferably operates in a gamma modified color space, transformed into an opponent color space with separate luminance and chromatic channels. The method also includes identifying a difference of at least one of the chromatic channels between an average color, determined for a region of interest in the digital image, and an ideal reference color for the feature the user desires to correct, as a basis for the color balancing process.

30 Claims, 6 Drawing Sheets
(3 of 6 Drawing Sheet(s) Filed in Color)

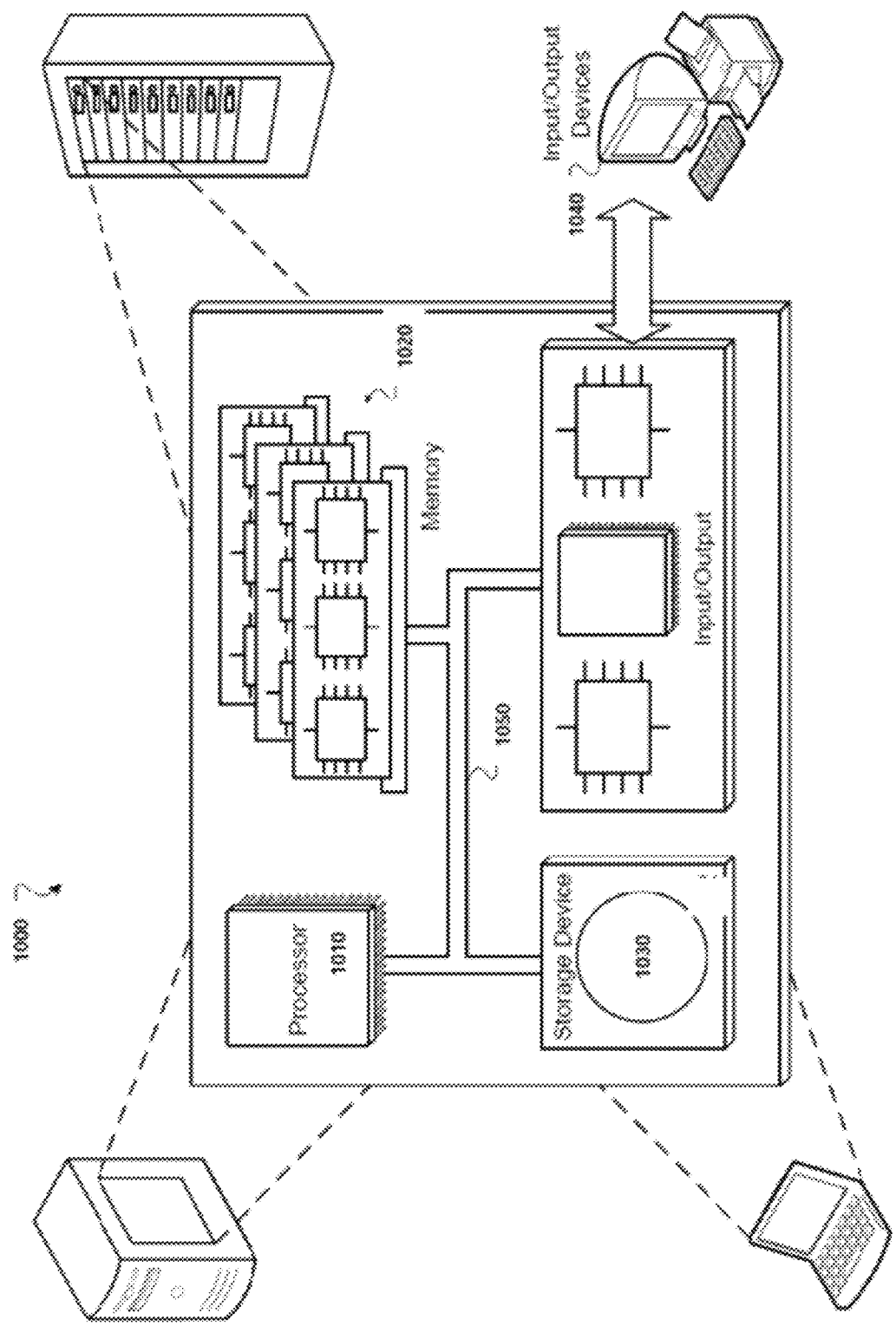

IMAGE CONTENT-BASED COLOR BALANCING

BACKGROUND

This disclosure relates to color balancing based on the content of a digital image.

Digital images are being used in a rapidly increasing number of applications. In many of those applications, automated analysis of digital images can be performed to enhance the picture quality. The quality of a digital image is often dependent on color levels and color intensity. For example, when capturing a digital photo, characteristics of the ambient environment, such as lighting or reflections off objects, may negatively impact the color representation of the digital picture such that subsequent adjustment of the colors may be desirable. Color balancing of such images tends to be challenging because the importance of particular color aspects (e.g., hue, saturation, chroma, colorfulness, value or lightness, and luminance) tends to vary from image to image. For example, some images may benefit from color adjustments to environmental elements such as grass, air, or water, while other images may benefit from color adjustments to human faces, or other body parts, and their corresponding skin tones.

SUMMARY

This disclosure describes, among other things, a color space, along with corresponding techniques, systems and computer programs or software, that facilitate color balancing of at least a portion of a digital image based on the image content.

In general, an aspect of the subject matter described in this disclosure can be implemented in methods performed by one or more software processes that include shifting the colors of essentially any feature in a digital image towards a desired reference color for the selected feature. The method includes designating a reference color in essentially any color space and determining a region of interest within a digital image. Further, the method includes converting the digital image and the reference color into a modified color space by applying a predetermined gamma value and transforming the digital image and reference color into an opponent color space. Generally, an opponent color space is defined by separate luminance and chromatic channels. The method further includes a color balancing process that may be performed in the opponent color space based on the difference of at least one channel of an average color, determined for the region of interest, and the reference color. Other embodiments of this aspect include corresponding apparatus, methods, and computer program products.

These and other implementations can include one or more of the following features. In some implementations, the reference color and the digital image can be accessed in a RGB color space. The method can further include the transformation into a YIQ opponent color space, where the difference of at least one of the chromatic I and Q channels provides the basis for the color adjustment process.

In some implementations the reference color may be designated by a manual selection of a user, a predetermined reference color within an application, or an automatically selected reference color. The method further includes the automatic selection of the reference color by determining an average color of a detected feature within essentially any digital reference image, such as face detection. Further, the method includes the selection of the reference color by a user from a predetermined color palette within an application.

In some implementations, the average color determined for the region of interest within the digital image can be adjusted by ignoring specific color values selected by a user. The method includes a selection by a user of essentially any area within the digital image defining the colors to be excluded from the color balancing process.

In some implementations, the region of interest can be determined by manual selection from a user or automatically selecting an area within the digital image, such as automatic feature or face detection.

In some implementations, the image processing operation may include adjusting the colors of the digital image by adding the color value difference of the average color and the reference color to the pixels of essentially any area within the digital image.

In some implementations, the difference between the reference color and the average color can further include a color adjustment component, which may be obtained by selection from a user, or may be automatically determined based on achromatic colors within the digital image. The method further includes defining the color adjustment by setting a strength or warmth component within an application.

In some implementations, the image processing operation can be made dependent on the range of colors appearing within the digital image and weighting that color range by the overall color characteristics of the digital image. The method includes testing the digital image for neutral and saturated colors and may provide for exclusion of specified color ranges from the image processing operation.

In some implementations, the processed image may be transformed from the opponent color space into the modified color space and further converted into the color space the operation was initiated from by applying an inverse gamma value.

Various implementations of the subject matter described herein may be configured so as to realize one or more of the following potential advantages.

The disclosed techniques may facilitate a color balancing functionality that minimizes, if not outright eliminates, impact on the luminance, or gray-scale, properties of the original digital image. Unlike most existing white balancing algorithms, which tend to require a user to choose a gray object within the digital image, the disclosed techniques may allow the user to select, without restriction, essentially any color appearing in a digital image. The selected color may then be used to correct colors of either the entire image or a selected subsection of the image by shifting the colors of the digital image towards a desired reference color.

Although not limited in potential application, examples of features within a digital image that the user may desire to enhance are areas such as sky, grass, water, and/or skin. The user can select essentially any representative feature within a digital image to generate a color average, which may then be used to shift the color scheme of the image towards an independently defined reference color (generally an idealized color for the feature to be color corrected).

It is noted that selected color values may be excluded when generating the average color, which serves as a basis to adjust the image color scheme. Limiting the color spectrum may be desired where the representative feature contains objects of which the colors are not meant to be corrected. For example, in images where a face is the desired feature for color correction, and the person in the image is wearing colored sunglasses, the color correction process can be configured to ignore the specific color pixels representing the color of the sunglasses to ensure that only the skin colors are corrected.

A potential implementation of the disclosed subject matter may employ automatic feature selection, such as face detection, to perform automatic color correction without further input from or interaction with the user, for example, based on an average color of the detected feature within the digital image. When used in combination with automatic face detection, creating individual reference colors for different people may be rendered unnecessary. For example, particularly in a modified YIQ color space as described in the disclosure, the color vectors I and Q of all skin types line up in the same dimensions, regardless of complexion, race, and ethnicity. An application may therefore use a predefined generic and idealized skin color to implement the color balancing method for essentially any image containing a face. It is also noted that color temperature (e.g. blackbody radiators) form a mostly straight line in this modified YIQ color space.

The subject matter described herein potentially allow for color balancing based on image content using essentially any reference color, whether present in the image or not. Application of the disclosed subject matter is not limited to a specific feature within a digital image.

It is noted that the implementation of the described color balancing process is not limited to digital still images, but further extends to other digital imaging technologies, such as digital video. The same process described in the disclosure for applying color balancing to digital images is applicable over a sequence of video frames.

These and other aspects, features and various combinations of them may be expressed, among other ways, as methods, apparatus, systems, means for performing functions, computer program products or the like.

Details of one or more implementations of the subject matter are set forth in the accompanying drawings and the description below. Other features, aspects, and potential advantages of the subject matter will be apparent from the description and drawings, and from the claims.

DESCRIPTION OF DRAWINGS

The file of this patent contains at least one drawing executed in color. Copies of this patent with color drawings will be provided by the Patent and Trademark Offices upon request and payment of the necessary fee.

FIG. 7 is a block diagram of a computing system.

DETAILED DESCRIPTION

Figure 1:
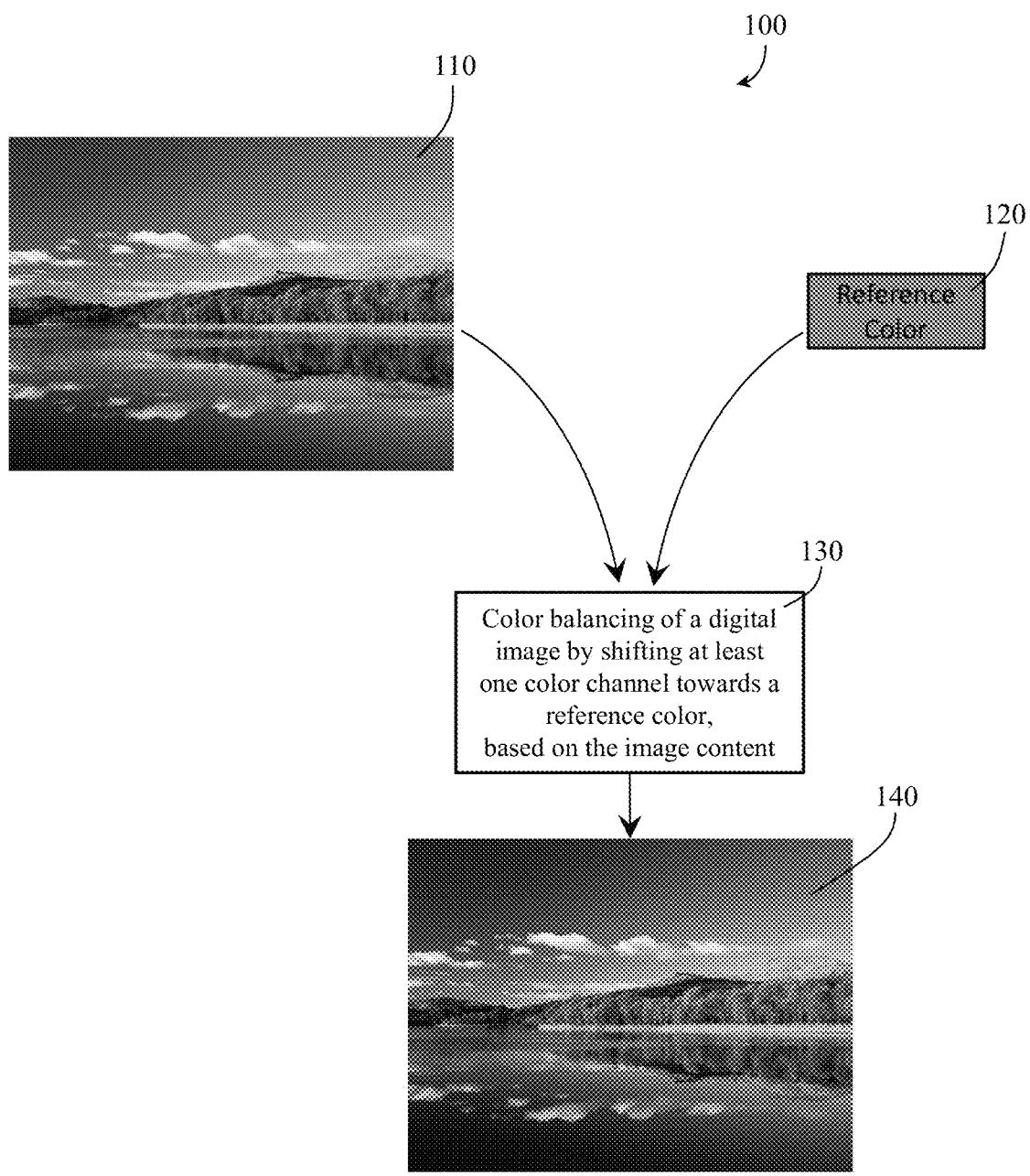
FIG. 1 illustrates an example of a color balancing process that is based on digital image content.

The subject matter described herein can be implemented in various ways. Some potentially useful implementations are described below. Descriptions of implementations of the subject matter are not necessarily descriptions of the claimed inventions, which are not limited to the detail implementations described in this section, but rather are described in broader terms in the claims.

Digital images are widely used for various purposes, including, but not limited to recreational, social networking, identification, or commercial applications. The quality of a digital image is an important factor for the effective and efficient utilization of the image. The color of the digital image is an essential element providing the commercial or social value for most applications.

For example, the digital photo of a person or landscape may be less than satisfactory if the colors are not true to nature and/or to the liking of the viewer. Because digital images may be created using any of a variety of devices, such as digital cameras, cell phones, laptops, or tablet computers, the corresponding image quality may vary significantly depending on the particular device and environmental conditions present at the time of image capture.

Colors often are impacted by the environmental circumstances under which an image is captured, such as indoor low light or outdoor sunlight conditions. A color balancing process may be required to convert the image into a usable or appealing representation of the contents to the human eye. The methods and systems described herein describe systems, techniques and computer programs that may be used for color balancing a digital image based on its color properties.

Such color properties are often described using color spaces which are mathematical models describing how colors can be represented as tuples of numbers, typically as three or four values or color components. Examples of commonly used color spaces include RGB, CMY, CMYK, YIQ, YUV, YCrCb, CIELAB, HSV, HSI, IHC and HSL. In general, color spaces may be broadly classified as being either Cartesian-based or polar coordinate-based. Some implementations of the described subject matter may benefit by operating in "opponent" color spaces, such as YIQ, YCrCb, or CIELAB.

Generally, opponent color spaces define the color spectrum by opponent chromatic channels, such as red versus green and blue versus yellow, and an opponent achromatic channel, black versus white. The achromatic channel generally represents the light-dark variation, or luminance, of the color space. An implementation of the color correction herein described is performed as an additive offset on the chromatic channels, isolated from the luminance channel, in an opponent color space.

The YIQ color space is a 3D Cartesian coordinate-based opponent color space. The Y component represents the nominal luminance, which describes the brightness in an image, the "black and white" or achromatic portion of the image. The I and Q color components represent the chrominance, which describes the color information in an image, where the I component represents the blue-orange axis, and the Q component the green-purple axis. The YIQ color space is intended to take advantage of the human color response characteristics. The human eye is more sensitive to spatial changes (e.g. change across location in the image) in luminance than changes to hue or saturation. The YIQ color space has been used primarily by the original NTSC (1953) color TV system.

Referring to FIG. 1, the example illustrates a digital image 110 that does not depict the desired blue color of the sky as shown by the reference color 120. The described subject matter enables the user to automatically adjust the color setting of the digital image to properly reflect the desired colors of selected features. The color balancing process 130 is performed by comparing the color levels of a selected area within the digital image 110 with a reference color 120. The reference color 120 describes the desired target color for a particular area or feature of the digital image 110. In the example of FIG. 1, the reference color 120 depicts a desired color for the sky.

The reference color 120 can be obtained by a variety of processes, including manual selection by the user, predetermined colors within the application (e.g. a color palette), or automatic selection of certain areas within a reference image. An example for automatic selection of the reference color is a face detection process used to identify the desired skin tone in a reference image by averaging the color values of an area containing a face. After determination of the reference color 120, the color balancing process 130 can be applied to adjust the color attributes of one or more color channels of the digital image 110 based on the reference color 120 by shifting the respective color channels of the digital image 110 towards the reference color 120. The end result is a corrected image 140 representing the desired color scheme.

The described subject matter is not limited to particular features, such as faces, grass, or skies, but can be implemented for essentially any feature contained within the image. The described process can also be used in combination with automatic feature selection processes of a particular region of interest. An implementation of the described subject matter is the automatic balancing process of an image in combination with face detection.

A face detection process is applied to the digital image and areas containing faces are used to define the region of interest. Predefined skin tone colors, such as cooler colors for indoor, and warmer colors for sunlight settings can be used as reference colors for automatic color adjustment. The subject matter described herein is not limited to the application of color balancing processes to the pixels of an entire image, but can also be implemented for essentially any area of an image.

Figure 2:
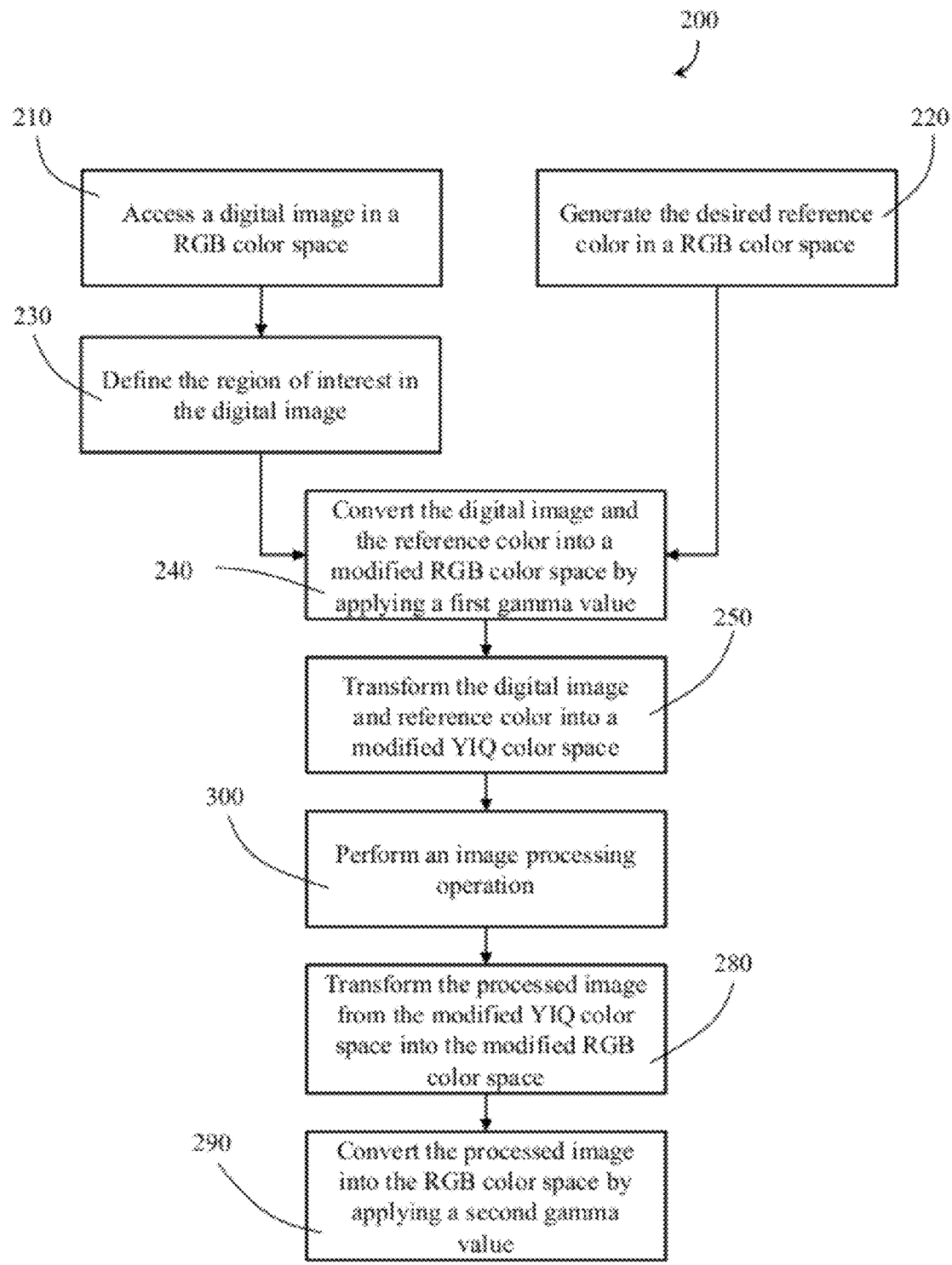
FIGS. 2-3 are flow diagrams of color balancing processes.

Referring to FIG. 2, a flow chart depicts an example of a color balancing process in a modified YIQ color space. Digital images are generally stored in some form of encoded color space. The process 200 illustrates an implementation in which color balancing is initiated with an image in a RGB color space. It is noted that the process may be initiated from essentially any color space. A method to obtain a digital image in a RGB color space is the software application ColorSync, a color management application programming interface (API), developed by Apple, Inc. This process is typically performed by using a tone reproduction curve (e.g. gamma) and a color matrix. It is noted that images can be transferred between different color spaces by well-known mathematical formulas and processes and no further detail discussion is necessary.

A digital image 210 is accessed in a RGB color space and loaded into an application performing the color balancing process. A desired reference color 220 also is also generated in the RGB color space. The reference color 220 can be defined by user selection (e.g. a specific area of interest of a reference image, such as grass, sky, a face, or chosen from a color palette), predefined in the application (e.g. standard skin tones), or obtained through automatic feature selection (e.g. face detection in a reference image). The reference color 220 is an idealized average color for a feature within a digital image the user desires to enhance. If an area of interest is selected to generate the reference color 220, the color values of the pixels within the selected area are averaged, defining the reference color 220.

A region of interest 230 generally depicts an area within a digital image on which the color balancing process may be based and can be determined by various methods, including manual selection by a user or automatic selection by an application. In combination with automatic feature selection, such as face detection, a region of interest 230 can be defined by an application without user input. The user can also define a region of interest 230 manually by selecting a range of pixels within a digital image 210. This can be essentially any area within an image depicting a feature a user desires to enhance, including, but not limited to, grass, sky, water, or skin.

A digital image 210 and a reference color 220 are converted into a modified representation within a RGB color space by exponentially applying a predetermined encoding gamma value 240. For this example, a steep encoding gamma value 240 of 0.2, 0.25, 0.3, etc. may be beneficial for this specific conversion, but it is noted that the full range of gamma values may be used.

$$rgb' = rgb_{linear}{}^{\gamma}$$

The application of a steep gamma value may result in better color separation of the chromatic channels for the following color balancing process.

The modified RGB representation of the digital image 210 and the reference color 220 may be transformed into a luminance-chrominance format color space with at least 3 channels. In the described example, the digital image 210 and the reference color 220 are preferably transformed into a YIQ color space. Since the basis for transformation into the YIQ color space is the modified RGB representation, the digital image 210 and reference color 220 are now depicted in a modified YIQ color space. For example, the conversion from the modified RGB to the modified YIQ color space can be calculated as:

$$\begin{bmatrix} Y' \\ I' \\ Q' \end{bmatrix} = \begin{bmatrix} 0.299 & 0.587 & 0.114 \\ 0.596 & -0.275 & -0.321 \\ 0.212 & -0.523 & 0.311 \end{bmatrix} \times \begin{bmatrix} R' \\ G' \\ B' \end{bmatrix}$$

Figure 3:
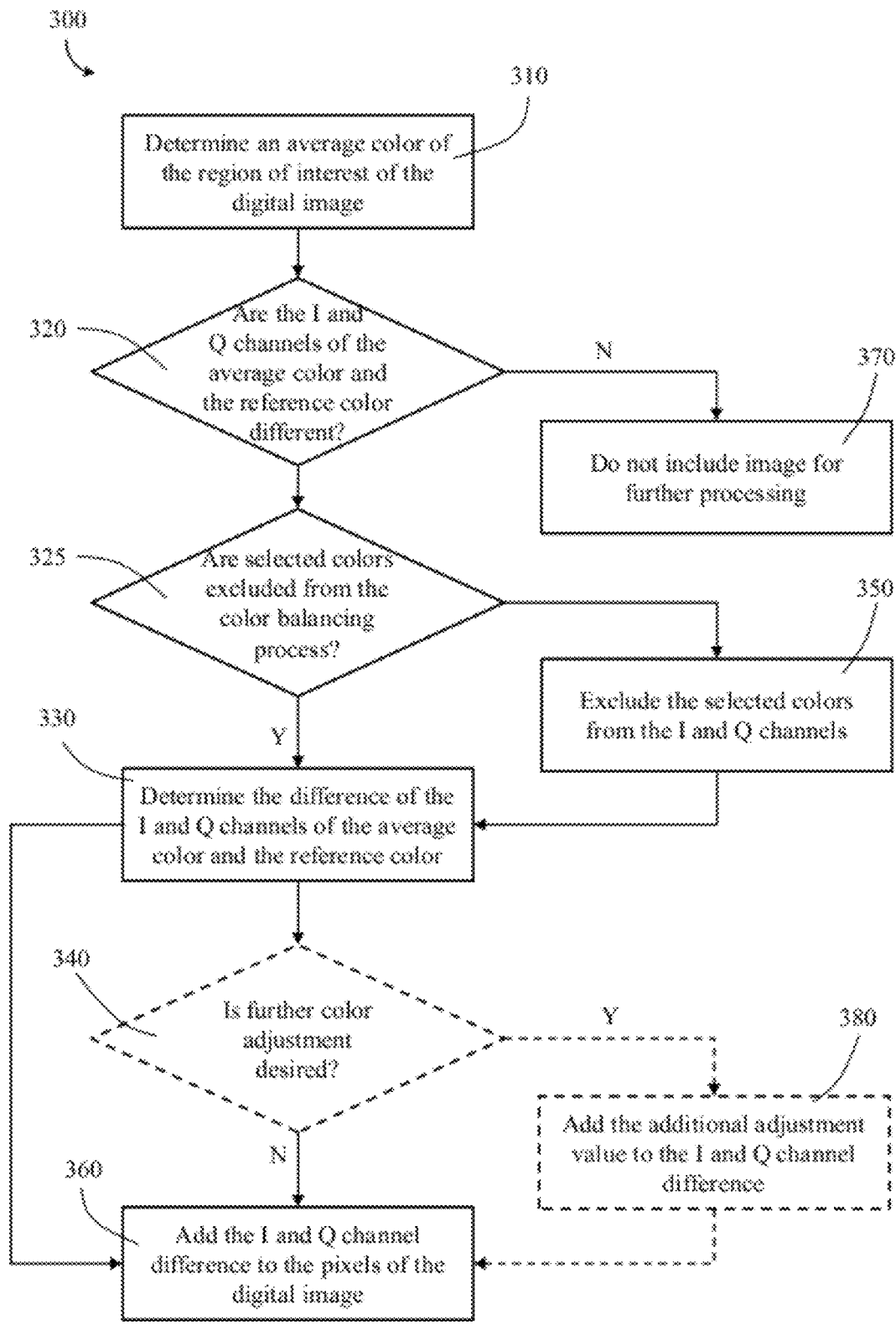

Referring to FIG. 3, a flow chart depicts the image processing operation 300. The prior selected region of interest 230, now described in the modified YIQ color space, may be averaged forming an average color 310, which embodies the color value of the YIQ channels for the selected pixels appearing within the region of interest 230. The average color 310 is a representation of the color range within the digital image the user desires to move towards the reference color 220.

The color range of the average color 310 may be further limited by excluding color values the user desires not to change as indicated at step 325. For example, colors of objects within the region of interest 230 that may not fit within the color range of the selected feature, such as red balloons in the sky or colored sunglasses on a face, can be excluded from the image processing operation to ensure that only desired color values are shifted towards a reference color.

In the described example, the Y channel may be ignored for the operation and only the I and Q channel values of the average color 310 and the reference color 220 are compared. The color difference 330 of the I and Q channels can be calculated as:

$$\Delta_{IQ} = IQ_{Original} - IQ_{Reference}$$

Ignoring the Y channel in the color balancing operation, as described above, ensures that the luminance (black and white) tone reproduction of the corrected image stays identical to the original image. If the I and Q channel values of the reference color 220 and average color 310 are identical, no value difference is calculated and further processing of the digital image 210 is not necessary, as indicated at step 320.

Within some implementations the user may desire to further adjust the color balance of an image to achieve an anticipated result. The above described color balancing process allows for implementation of additional, manual or automatic, refinement of a digital image. The color difference 330 can be refined with a color adjustment component 340, forming an adjusted color difference 380. The color adjustment component 340 includes, but is not limited to, a function of user inputs or the chromatic content of a digital image. The color adjustment component 340 can be controlled manually by the user, generally through a user interface 400, or automatically within the application.

Figure 4:
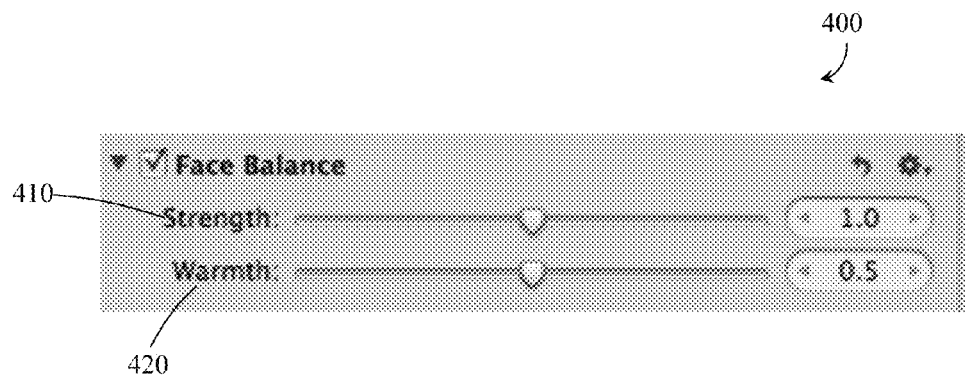
FIG. 4 shows an example of a user interface that may be used to adjust color balancing intensity.

FIG. 4 illustrates a sample user interface. An implementation as shown in FIG. 4 allows for color adjustment based on a strength component 410 and a warmth component 420, which provide an option to the user to further refine the color scheme of an image. For example, in many applications it is desirable to maintain the achromatic appearance of objects in a setting where the image contains achromatic colors such as dark shadows, dark hair, or bright highlights (e.g. specular reflections on clouds). The strength component 410 can be expressed as a function of chroma, based on the I and Q channels of a digital image as shown below.

$$chroma = 2.0 \times \sqrt{I^2 + Q^2}$$

$$scale = chroma^4 (1 - chroma^4)$$

$$strength = userinput \times scale$$

For example, a strength value of 0 can prevent color correction, whereas a strength value greater than 1 can overcorrect an image. The warmth component 420 may provide an option for the user to adjust the color scheme of an image to reflect a desired setting. For example, the warmth component 420 can be a linear interpolation between two idealized skin tones, a cooler "indoor" skin tone and a warmer "sunlight" skin tone, allowing the user to shift to color scheme between two settings.

Another example for additional adjustment and control over the color balancing process may be the application of a weighting function in a color space. A range of colors may be excluded from processing if the color characteristics of the image would render such processing undesirable. For instance, an image can be tested for neutral and highly saturated colors that should remain unchanged and excluded from further processing.

Referring back to FIG. 3, the color difference 330, or the adjusted color difference 380, can be used to shift the color scheme of the digital image 210 towards a desired color representation based on the reference color 220. The color difference 330, or 380, may be added to the pixels of the digital image 210, forming the processed image 360.

$$IQ_{corrected} = IQ_{Original} + \text{adjustment value} \times \Delta_{IQ}$$

It is noted that the color balancing process does not need to be applied to each pixel within a digital image, it may also be performed on a selected subset of pixels. For example, an implementation adjusts the I and Q channels of each individual pixel within the digital image 210, another implementation adjusts only a selected area of pixels within the digital image 210, such as the region of interest 230. An implementation of the above described color balancing process only modifies the chrominance of a digital image, but not the luminance, by excluding the Y channel of the YIQ color space.

Referring back to FIG. 2, the processed image 360 may be converted from the modified YIQ color space to the modified RGB color space using an inverse matrix:

$$\begin{bmatrix} R' \\ G' \\ B' \end{bmatrix} = \begin{bmatrix} 1.0 & 0.956 & 0.621 \\ 1.0 & -0.272 & -0.647 \\ 1.0 & -1.105 & 1.702 \end{bmatrix} \times \begin{bmatrix} Y' \\ I' \\ Q' \end{bmatrix}$$

Finally, the processed image 360, in the modified RGB color space, may be transformed into a standard linear RGB color space by applying a decoding gamma value 290.

$$rgb_{linear} = rgb'^{1/\gamma}$$

In this specific example, the decoding gamma value 290 is the inverse encoding gamma value 240.

Figure 5:
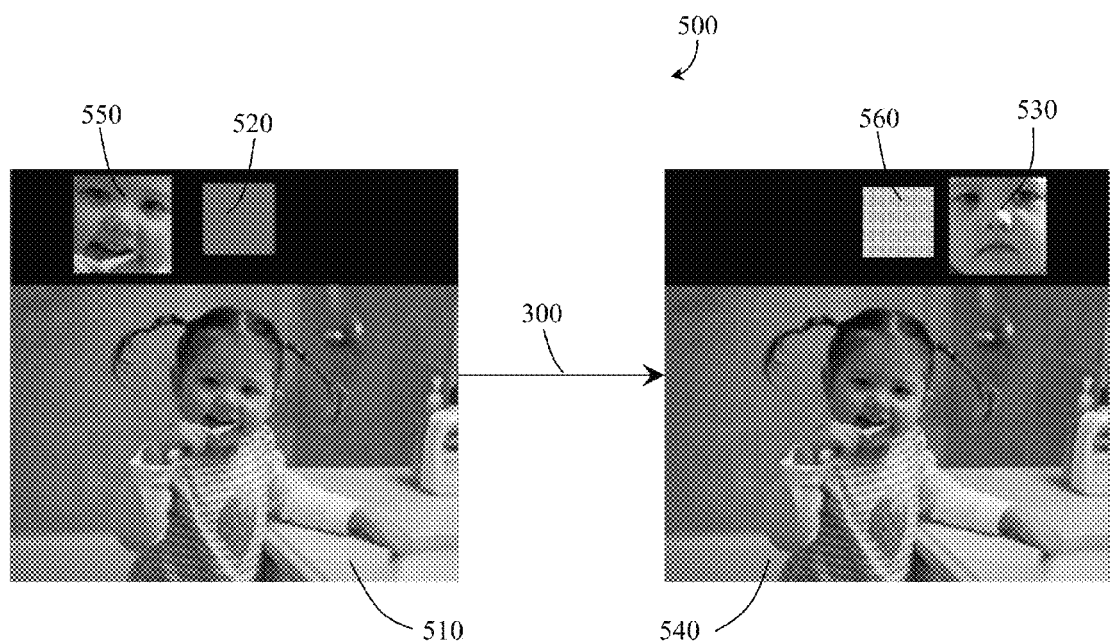
FIGS. 5-6 illustrate examples of an implementation of a color balancing process.
Figure 6:
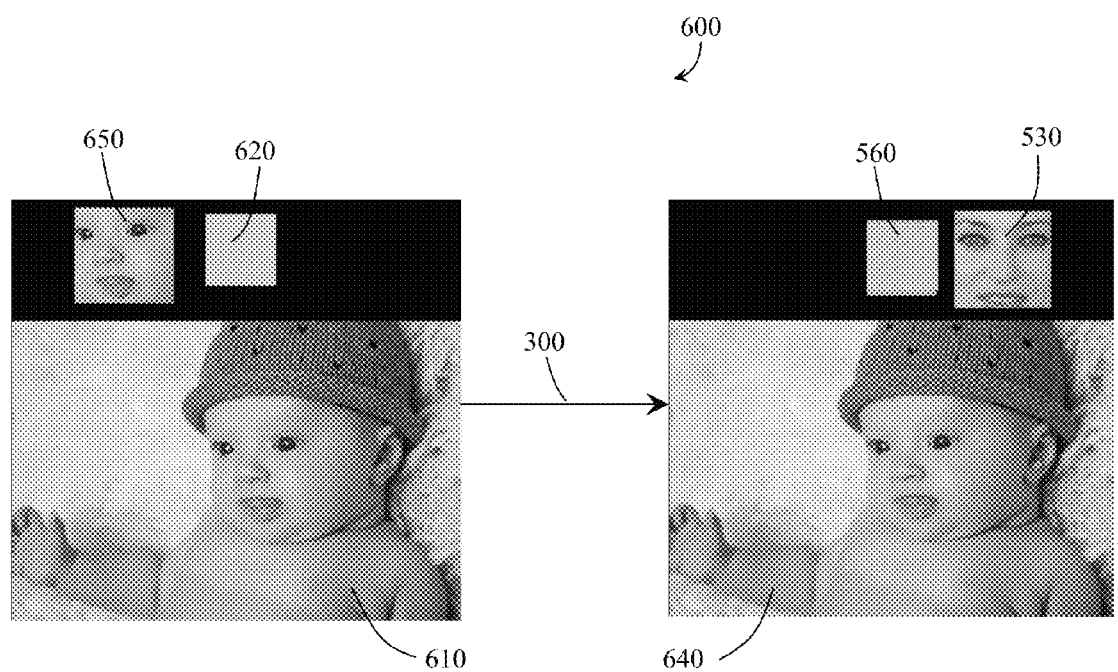

FIGS. 5 and 6 illustrate examples of the above described I and Q channel color balancing process of a digital image, based on a reference color. In FIG. 5, a digital image 510 illustrates skin tones that appear in a yellow color spectrum, not reflecting the desired natural skin color as shown in a reference image 530. Here it is desired to move the color scheme of the digital image 510 towards the more natural skin color shown in the reference image 530, without affecting luminance (black and white levels) of the digital image 510.

In the YIQ color space, the I and Q channel values for skin colors are not dependent on the actual skin tone of the person presented in an image and therefore are generally applicable, regardless of complexion, ethnicity, or race. A reference skin color 560 can be derived from essentially any source, regardless whether the reference person and the person depicted in the digital image 510 are identical or of the same ethnicity or race.

It is noted, that the reference color 560 also can be predefined within an application as described above. For example, two idealized skin colors, one for indoor lighting, one for outdoor sunlight, may be provided as standard reference colors for the color balancing process of a digital image within an application. In this example, the reference color 560 is derived by averaging the color values of the reference image 530, showing the desired natural color of a face. The average color 520 is derived by averaging the color values of the region of interest 550 within the digital image 510.

In combination with face detection, the selection of the region of interest 550 can be, but does not have to be, performed automatically, without manual input by the user. In this example, the digital image 510 and the reference color 560 are transformed into the YIQ space as described above.

The color balancing process 300 shifts the colors in the digital image 510 towards the desired reference color 560 by adding the I and Q channel color differences between the reference color 560 and the average color 520 to each pixel of the digital image 510, forming the processed image 540. It is noted, that the color balancing process may be applied to the entire digital image, but can also be applied only to a selected subset of pixels within the digital image, such as a region of interest.

FIG. 6 illustrates an application of the color balancing process with a digital image 610 showing skin tones of an infant depicted in the image that appear in a blue color spectrum. Here it is desired to reduce the overbearing blue colors represented in the digital image 610 and shift the color scheme towards a natural skin color as shown in the reference image 530, without affecting luminance (black and white levels) of the digital image 610. As mentioned above, it is irrelevant whether the reference image 530 and the digital image 610 depict the same person, same ethnicity, or race.

The same reference image 530 and therefore the same reference color 560 may be applied to the color balancing process of the digital image 610. An average color 620 is derived by averaging the color values of a region of interest 650. After conversion into the YIQ color space, the above described color balancing process 300 may be applied, shifting the color scheme in the digital image 610 towards the reference color 560, reducing the blue color reflection.

The above described color balancing process only adjusts the chrominance levels of a digital image, not the luminance. This method ensures that the gray-scale of a digital image is not impacted by the process, and only the image colors are adjusted.

System Overview

FIG. 7 is a schematic diagram of a computing device 1000. The computing device 1000 can be used for the operations described in association with any of the computer-implemented methods described herein, according to an implementation. A multitude of computing devices may be used to implement the systems and methods described in this document, as either a client or as a server or plurality of servers. A computing device can be implemented in various forms of digital computers, such as laptops, desktops, tablet computers, workstations, personal digital assistants, servers, blade servers, mainframes, and other appropriate computers.

Another computing device can be implemented in various forms of mobile devices, such as personal digital assistants, cellular telephones, smartphones, digital cameras, digital video recorders, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

The computing device 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the computing device 1000. In an implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the computing device 1000. In some implementations, the memory 1020 is a computer-readable medium. The memory 1020 can include volatile memory and/or non-volatile memory.

The storage device 1030 is capable of providing mass storage for the computing device 1000. In an implementation, the storage device 1030 is a computer-readable medium. In various different implementations, the storage device 1030 may be a floppy disk device, a hard disk device, an optical disk device, or a tape device.

The input/output device 1040 provides input/output operations for the computing device 1000. In some implementations, the input/output device 1040 includes a keyboard and/or pointing device. In some implementations, the input/output device 1040 includes a display unit for displaying graphical user interfaces.

The features described can be implemented in digital electronic circuitry, or in computer hardware, firmware, or in combinations of them. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output.

The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data.

Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing device that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing device can include clients and servers. A client and server are generally remote from each other and typically interact through a network, such as the described one. The relationship of client and server arises by virtue of computer programs running on the respective computers and having a client-server relationship to each other.

The processor 110 carries out instructions related to a computer program. The processor 110 may include hardware such as logic gates, adders, multipliers and counters. The processor 110 may further include a separate arithmetic logic unit (ALU) that performs arithmetic and logical operations.

A number of implementations have been described. Nevertheless, it will be understood that various modifications may be made without departing from the spirit and scope of the following claims. For example, the techniques described herein can be performed in a different order and still achieve desirable results.

What is claimed is:

1. A method comprising:
designating, by a processing device, a reference color encoded in a first color space;
determining, by the processing device, a region of interest in a digital image comprised of a plurality of pixels, the determined region of interest comprising a first subset of the plurality of pixels;
converting, by the processing device, the digital image and the reference color into a modified color space by applying a predetermined gamma value;
transforming, by the processing device, the reference color and the digital image, including the determined region of interest, into an opponent color space comprising separate luminance and chromatic channels;
determining, by the processing device, in the opponent color space, an average color of at least a subset of colors appearing within the transformed region of interest's subset of pixels;
determining, by the processing device, a difference of at least one channel in the opponent color space between the determined average color and the reference color; and
performing, by the processing device, an image processing operation on any of the plurality of pixels within the digital image based on the determined difference.

2. The method of claim 1, wherein the first color space is a RGB color space.

3. The method of claim 2, wherein the opponent color space is a YIQ color space.

4. The method of claim 3, wherein the difference between the determined average color and the reference color is determined only for the I and Q channels.

5. The method of claim 1, wherein designating the reference color comprises at least one of receiving a manual selection from a user, using a predetermined reference color, and automatically selecting a reference color.

6. The method of claim 5, wherein automatically selecting a reference color comprises determining an average color of a detected feature within any digital image.

7. The method of claim 5, wherein using the predetermined reference color comprises selecting a color from a predetermined color palette within an application.

8. The method of claim 1, wherein determining the average color of at least a subset of colors comprises receiving a selection from a user to ignore one or more specified color values when determining the average color.

9. The method of claim 8, wherein receiving a selection from the user to ignore one or more specified color values comprises selecting colors of a third subset of the plurality of pixels within the digital image.

10. The method of claim 1, wherein determining the region of interest comprises at least one of receiving a manual selection from a user and automatically selecting the first subset of the plurality of pixels of the digital image.

11. The method of claim 10, wherein automatically selecting comprises at least one of automatically detecting a feature and automatically detecting a face.

12. The method of claim 1, wherein the image processing operation comprises adjusting color of the digital image by adding the determined difference to any of the plurality of pixels of the digital image.

13. The method of claim 1, wherein determining the difference further comprises adding a color adjustment component.

14. The method of claim 13, wherein adding the color adjustment component comprises at least one of receiving a manual selection from a user and automatically determining adjustment values based on achromatic colors in the digital image.

15. The method of claim 14, wherein the color adjustment component further comprises at least one of setting a strength component and setting a warmth component.

16. The method of claim 1, wherein performing the image processing operation further comprises determining a range of colors of the plurality of pixels within the digital image and weighing the determined range of colors by color characteristics of the digital image.

17. The method of claim 16, wherein weighing the determined range of colors by the color characteristics of the digital image comprises testing the digital image for neutral and saturated colors.

18. The method of claim 16, wherein the determined range of colors is excluded from the image processing operation.

19. The method of claim 1, comprising:
transforming the processed image from the opponent color space into the modified color space; and
converting the transformed image into the first color space by applying an inverse predetermined gamma value.

20. A computer program product, encoded on a non-transitory computer-readable medium, operable to cause data processing apparatus to perform operations comprising:
designating a reference color encoded in a first color space;
determining a region of interest in a digital image comprised of a plurality of pixels, the determined region of interest comprising a first subset of the plurality of pixels;
converting the digital image and the reference color into a modified color space by applying a predetermined gamma value;
transforming the reference color and the digital image, including the determined region of interest, into an opponent color space comprising separate luminance and chromatic channels;
determining, in the opponent color space, an average color of at least a subset of colors appearing within the transformed region of interest's subset of pixels;
determining a difference of at least one channel in the opponent color space between the determined average color and the reference color; and
performing an image processing operation on any of the plurality of pixels within the digital image based on the determined difference.

21. The computer program product of claim 20, wherein the opponent color space is a YIQ color space and the difference between the determined average color and the reference color is determined only for the I and Q channels.

22. The computer program product of claim 20, wherein determining the average color of at least a subset of colors comprises receiving a selection from a user to ignore one or more specified color values when determining the average color.

23. The computer program product of claim 20, wherein the image processing operation comprises adjusting color of the digital image by adding the determined difference to any of the plurality of pixels of the digital image.

24. The computer program product of claim 20, wherein determining the difference comprises adding a color adjustment component.

25. The computer program product of claim 24, wherein adding the color adjustment component comprises at least one of receiving a manual selection from a user and automatically determining adjustment values based on achromatic colors in the digital image.

26. The computer program product of claim 20, wherein performing the image processing operation comprises determining a range of colors of the plurality of pixels within the digital image and weighing the determined range of colors by color characteristics of the digital image.

27. A system comprising:
a computer operable to interact with a user interface device and operable to preform operations comprising:
designating a reference color encoded in a first color space;
determining a region of interest in a digital image comprised of a plurality of pixels, the determined region of interest comprising a first subset of the plurality of pixels;
converting the digital image and the reference color into a modified color space by applying a predetermined gamma value;
transforming the reference color and the digital image, including the determined region of interest, into an opponent color space comprising separate luminance and chromatic channels;
determining, in the opponent color space, an average color of at least a subset of colors appearing within the transformed region of interest's subset of pixels;
determining a difference of at least one channel in the opponent color space between the determined average color and the reference color; and
performing an image processing operation on any of the plurality of pixels within the digital image based on the determined difference.

28. The system of claim 27, wherein the opponent color space is a YIQ color space and the difference between the determined average color and the reference color is determined only for the I and Q channels.

29. The system of claim 27, wherein determining the average color of at least a subset of colors comprises receiving a selection from a user to ignore one or more specified color values when determining the average color.

30. The system of claim 27, wherein the image processing operation comprises adjusting color of the digital image by adding the determined difference to any of the plurality of pixels of the digital image.

* * * * *